United States Patent [19]

Luckenbach

[11] 4,235,704

[45] Nov. 25, 1980

[54] METHOD OF REDUCING OXIDES OF NITROGEN CONCENTRATION IN REGENERATION ZONE FLUE GAS

[75] Inventor: Edward C. Luckenbach, Mountainside, N.J.

[73] Assignee: Exxon Research & Engineering Co., Florham Park, N.J.

[21] Appl. No.: 67,995

[22] Filed: Aug. 20, 1979

[51] Int. Cl.³ .................... C10G 11/02; C10G 11/18
[52] U.S. Cl. .......................... 208/113; 208/52 CT; 208/121; 208/DIG. 1; 208/164; 252/411R; 252/417; 423/235; 423/246
[58] Field of Search ............. 423/235, 246; 208/113, 208/120, DIG. 1, 164

[56] References Cited

U.S. PATENT DOCUMENTS

| | | | |
|---|---|---|---|
| 4,064,037 | 12/1977 | Graven et al. | 208/120 |
| 4,088,568 | 5/1978 | Schwartz | 208/121 |
| 4,093,535 | 6/1978 | Schwartz | 208/DIG. 1 |
| 4,093,537 | 6/1978 | Gross et al. | 208/164 |
| 4,108,795 | 8/1978 | Hemler et al. | 252/419 |
| 4,118,339 | 10/1978 | Latos | 252/417 |
| 4,171,286 | 11/1978 | Dight et al. | 208/120 X |

FOREIGN PATENT DOCUMENTS 2825074 12/1978 Fed. Rep. of Germany ........... 208/120
1499682 2/1978 United Kingdom ..................... 208/120

OTHER PUBLICATIONS

"Optimal Control of FCC Process" Automatica, vol. 6, pp. 693–703 (1970).

Primary Examiner—Delbert E. Gantz
Assistant Examiner—G. E. Schmitkons
Attorney, Agent, or Firm—Edward H. Mazer

[57] ABSTRACT

A method for controlling the oxides of nitrogen concentration in the exit flue gas from the regeneration zone of a catalytic cracking unit employing carbon monoxide combustion promoters which comprises monitoring the oxides of nitrogen concentration in the exit flue gas and adjusting the concentration of combustion promoter present in the regeneration zone to maintain the oxides of nitrogen concentration below a predetermined limit.

12 Claims, 1 Drawing Figure

METHOD OF REDUCING OXIDES OF NITROGEN CONCENTRATION IN REGENERATION ZONE FLUE GAS

BACKGROUND OF THE INVENTION

1. Field of the Invention

The present invention relates to the reduction of oxides the nitrogen in the exit flue gas from the regeneration zone of a catalytic cracking operation employing carbon monoxide combustion promoters. More particularly, this invention is related to a method for controlling the amount of carbon monoxide combustion promoter in the regeneration zone to produce low levels of carbon monoxide and nitrogen oxides.

2. Description of the Prior Art

It has been found that oxides of nitrogen, primarily NO and $NO_2$, are formed at high temperatures, such as the temperature at which catalyst utilized in a hydrocarbon cracking process is regenerated in the presence of carbon monoxide combustion promoters. As hydrocarbons such as petroleum feedstocks are cracked, coke is deposited on the catalyst particles. The coke formation on the particles progressively decreases the effectiveness of the particles. Eventually the effectiveness of the catalyst declines to the point where the coke must be burned off the particles. This step, which is normally referred to as regeneration, may be done on a batch or a continuous basis by contacting the catalyst particles with a regeneration gas, such as air. The conversion of the coke to CO and $CO_2$ is an exothermic reaction in which a substantial amount of the liberated heat is absorbed by the catalyst. To utilize this heat in the cracking process, many cracking installations utilize a continuous circulation of catalyst between the cracking zone and the regeneration zone. To maximize the heat recovered from the regeneration zone, only slightly more than the stoichiometric amount of air required normally is utilized. Often, the combustion of the coke to $CO_2$ in the regeneration zone dense phase catalyst bed is not complete, with combustion of the CO to $CO_2$ also occurring in the dilute catalyst phase above the dense phase catalyst bed. This phenomena, which is known as "afterburning" may be injurious to the regeneration zone equipment and catalyst. Since there is relatively little catalyst in the dilute phase to absorb the heat of combustion, afterburning may raise the temperature in this region above the maximum permissible regeneration zone working temperature.

Increasingly stringent environmental regulations also restrict the maximum allowable concentration of CO in the regeneration zone flue gas. One method to minimize the amount of CO in the effluent gas and to prevent "afterburning" has been to increase the regeneration gas inlet rate. This method is not favored, however, since it decreases the amount of heat recovered and may require larger regeneration equipment, such as larger regeneration gas blowers. Accordingly, catalysts for promoting combustion or oxidation have been either incorporated into the cracking catalyst or separately added to the fluidized continuous cracking system to facilitate the conversion of CO to $CO_2$ in the regeneration zone. It has been found that the concentration of the carbon monoxide combustion promoter must be kept relatively low, since the promoters contribute to the formation of excessive amounts of coke and hydrogen in the cracking zone.

Combustion promoters incorporating noble metals have been developed which effectively promote the conversion of CO to $CO_2$ while not resulting in excessive coke and hydrogen formation. It has been found that utilization of these noble metal combustion promoters at the recommended levels of about 0.05 to about 100 parts per million by weight (wppm) of noble metal in the total weight of catalyst has led to the formation of significant quantities of oxides of nitrogen. Such oxides of nitrogen have several undesirable properties. Oxides of nitrogen are believed to contribute to eye irritation and to respiratory problems. In addition, oxides of nitrogen contribute to the formation of smog. As a result, air quality standards normally include a maximum allowable $NO_x$ concentration. For example, the national ambient air quality standard for the United States contains a maximum annual average $NO_2$ concentration of one microgram per cubic meter, which is equivalent to about 0.05 parts per million by volume. While the oxides of nitrogen concentration may not be of immediate concern in many areas, in heavily populated locations increasingly stringent air pollution requirements may restrict the maximum allowable $NO_x$ concentration still further.

SUMMARY OF THE INVENTION

It has been found that the concentration of oxides of nitrogen in the exit flue gas from the catalyst regeneration zone may be effectively controlled by adjusting the concentration of carbon monoxide combustion promoter in relation to the level of nitrogen oxides monitored in the flue gas. Accordingly, in a catalytic cracking process wherein:

(a) hydrocarbon feedstock is contacted with a catalyst under cracking conditions to produce cracked hydrocarbon vapors and coke contaminated catalyst; and (b) the coke contaminated catalyst subsequently is contacted in a regeneration zone under regeneration conditions in the presence of a carbon monoxide combustion promoter with an oxygen and nitrogen-containing regeneration gas to thereby at least partially combust the coke and form oxides of nitrogen which thereafter became part of the exit flue gas, the improvement which comprises:

(i) monitoring the nitrogen oxides concentration in the exit flue gas from the regeneration zone; and (ii) adjusting the concentration of combustion promoter in the regeneration zone in relation to the concentration of nitrogen oxides monitored in the flue gas to maintain the concentration of nitrogen oxides in the flue gas below a predetermined level.

The combustion promoter may be any compound which promotes the conversion of CO to $CO_2$ without significant adverse effect on the cracking operation. Among the preferred metals which may be utilized in combustion promoters are: gold, silver, platinum, palladium, iridium, rhodium, mercury, ruthenium, osmium, or rhenium, with the most commonly used being platinum.

BRIEF DESCRIPTION OF THE DRAWING

The FIGURE is a flow diagram of the present process as applied to one type of fluidized catalytic cracking unit.

DETAILED DESCRIPTION OF THE INVENTION

Figure 1:
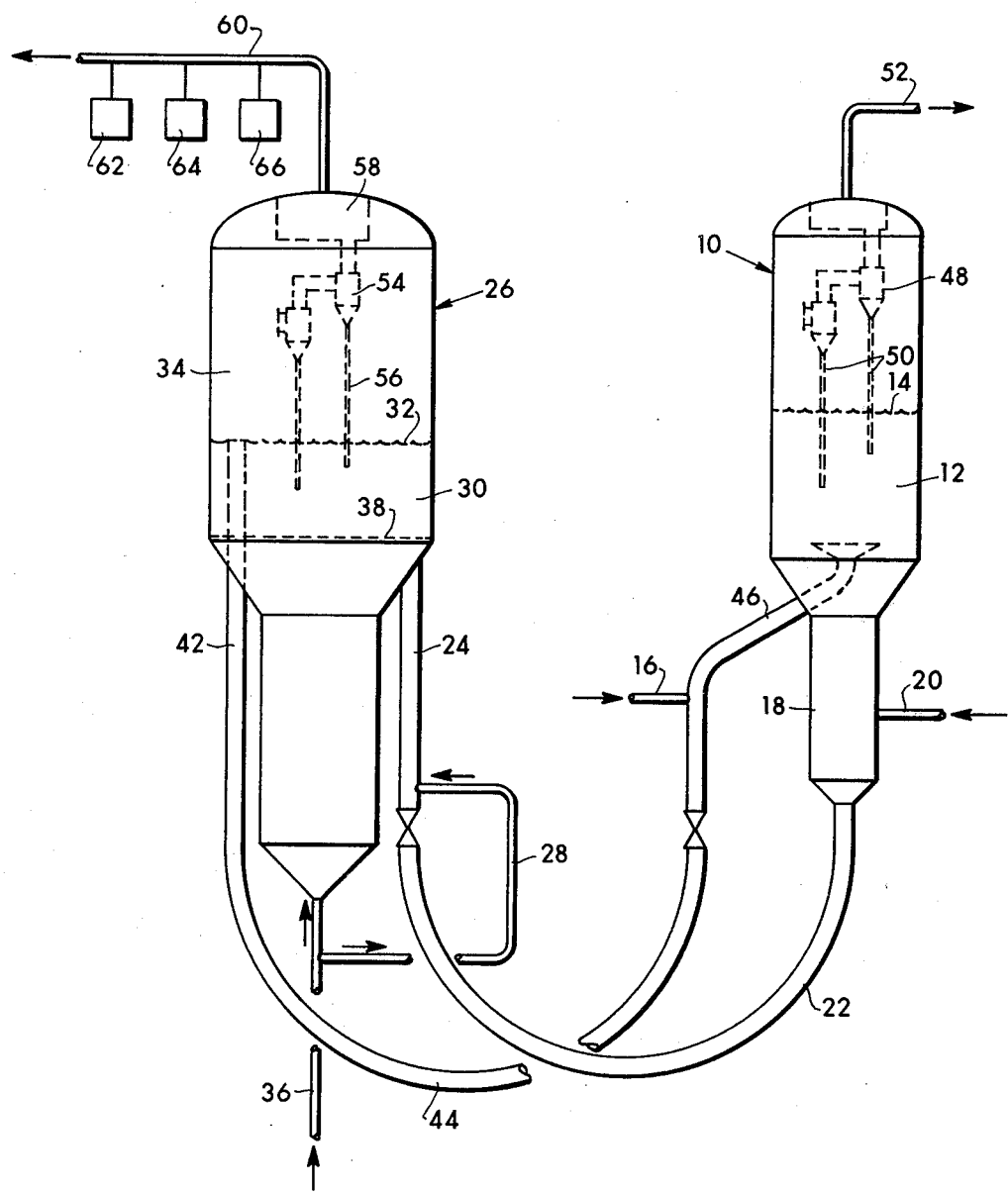

The subject invention will now be illustrated by reference to the FIGURE which illustrates how the present invention may be applied to a typical fluid catalytic cracking unit. A vertically arranged cylindrical reaction or cracking zone 10 is shown containing a fluidized bed 12 of the catalyst having a level indicated at 14, in which a hydrocarbon feedstock introduced at line 16 is undergoing catalytic cracking. Normally the reaction zone is maintained at a temperature of 850° to 1100° F. and a pressure of 0 to 50 psig. Hydrocarbon feedstocks that can be suitably employed in a fluid catalytic cracking process include naphthas, light gas oils, heavy gas oils, wide-cut gas oils, vacuum gas oils, kerosenes, decanted oils, residual fractions, reduced crude oils, cycle oils derived from any of these, as well as suitable fractions derived from shale oil, kerogen, tar sands bitumen processing, synthetic oils, coal hydrogenation, and the like. Such feedstocks may be employed singly, separately in parallel reaction zones, or in any desired combination. Hydrocarbon gas and vapors passing through fluid bed 12 maintain the bed in a dense turbulent fluidized condition having the appearance of a boiling liquid.

In reaction zone 10, the cracking catalyst becomes spent during contact with the hydrocarbon feedstock due to the deposition of coke thereon. Thus, the terms "spent" or "coke-contaminated" catalyst, as used herein, generally refer to catalyst which has passed through a reaction zone and which contains a sufficient quantity of coke thereon to cause activity loss, thereby requiring regeneration. Generally, the coke content of spent catalyst can vary anywhere from about 0.5 to about 5 wt.% or more. Typically, spent catalyst coke contents vary from about 0.5 to about 1.5 wt.%.

Prior to actual regeneration, the spent catalyst is usually passed from the reaction zone into a stripping zone 18 and contacted therein with a stripping gas, which is introduced into the lower portion of zone 18 via line 20. The stripping gas, which is usually introduced at a pressure of from about 10 to about 50 psig, serves to remove most of the volatile hydrocarbons from the spent catalyst. Normally, the stripping zone is maintained at essentially the same temperature as the reaction zone, i.e., from about 850° to about 1100° F.

Spent catalyst from which most of the volatile hydrocarbons have been stripped is then passed from the bottom of stripping zone 18, through U-bend 22 and into a connecting vertical riser 24 which extends into the lower portion of a regeneration zone 26. Air is added to riser 24 via line 28 in an amount sufficient to reduce the density of the catalyst flowing therein, thus causing the catalyst to flow upward into the regeneration zone 26 by simple hydraulic balance.

In the particular configurations shown in the FIGURE, the regeneration zone is a separate vessel arranged at approximately the same level as reaction zone 10 containing a dense phase catalyst bed 30 having a level indicated at 32, which is undergoing regeneration to burn off coke deposits formed in the reaction zone during the cracking reaction, above which is a dilute catalyst phase 34. An oxygen-containing regeneration gas enters the lower portion of regeneration zone 26 via line 36 and passes up through a grid 38 and the dense phase catalyst bed 30, maintaining it in a turbulent fluidized condition similar to that present in reaction zone 10.

Normally, the oxygen-containing regeneration gas used in regenerating the spent catalyst is air, or air enriched with oxygen. Nitrogen present in the air and nitrogeneous compounds carried over into regeneration zone 26 with the circulating catalyst from reaction zone 10 is catalyzed by the combustion promoter to form various oxides of nitrogen. As described hereinafter, the concentration of combustion promoter may be adjusted to regulate the concentration of oxides of nitrogen in the exit flue gas. Steam also may be added to the dense phase bed along with the regeneration gas or separately therefrom to provide additional inert diluents and/or fluidization gas. Typically, the specific vapor velocity of the regeneration gas will be in the range of from about 0.8 to about 6.0 feet/second, preferably from about 1.5 to about 4 feet/second.

Regenerated catalyst from the dense phase catalyst bed 30 in the regeneration zone 26 flows downward through standpipe 42 and passes through U-bend 44 into the reaction zone 10 by way of transfer line 46, which joins U-bend 44 at the level of the oil injection line 16 above the U-bend. By regenerated catalyst is meant catalyst leaving the regeneration zone which has contacted an oxygen-containing gas causing at least a portion, preferably a substantial portion, of the coke present on the catalyst to be removed. More specifically, the carbon content of the regenerated catalyst can vary anywhere from about 0.01 to about 0.2 wt.%, but preferably is from about 0.01 to about 0.1 wt.%.

The hydrocarbon feedstock for the cracking process is injected into line 46 through line 16 to form an oil and catalyst mixture which is passed into the fluid bed 12 within the reaction zone 10. Product vapors containing entrained catalyst particles pass overhead from fluid bed 12 into a gas-solid separation means 48 where most of the entrained catalyst particles are separated therefrom and returned through diplegs 50 leading back into fluid bed 12. The product vapors are then conveyed through line 52 into the product recovery system (not shown).

In regeneration zone 26, flue gases formed during regeneration of the spent catalyst pass from the dense phase catalyst bed 30 into the dilute catalyst phase 34 along with entrained catalyst particles. A substantial portion of the catalyst particles are separated from the flue gas by a suitable gas-solid separation means 54 and returned to the dense phase catalyst bed 30 via diplegs 56. The substantially catalyst-free flue gas then passes into a plenum chamber 58 prior to discharge from the regeneration zone 26 through line 60.

Oxides of nitrogen sensor means, such as sensor 62, carbon monoxide sensor means, such as sensor 64, and oxygen sensor means, such as sensor 66, are shown disposed in line 60 for monitoring the nitrogen oxide, CO, and oxygen concentrations respectively, in the exit flue gas, although the sensors also could be disposed in dilute phase 34, preferably near the top of regeneration zone 26.

Sensors 62, 64 and 66 may merely indicate the composition of the monitored components in line 60. Alternatively, one or more could communicate with control valves for adjusting process variables, including, but not limited to, the catalyst circulation rate, and the rate of addition of combustion promoter to the system.

The flue gas CO concentration preferably is kept as low as possible to minimize afterburning. Typically, the flue gas will contain less than about 0.2, preferably less than 0.1, and more preferably less than 0.05 volume % carbon monoxide. To accomplish this, combustion promoters frequently are added to the fluid catalytic cracking system to facilitate the conversion of CO to $CO_2$ within dense phase catalyst bed 30. As previously indicated, use of combustion promoters may increase hydrogen and coke makes in reaction zone 10, as well as increase the formation of oxides of nitrogen in regeneration zone 26.

The conversion of CO to $CO_2$ is facilitated by an increase in regeneration zone temperature. Thus, less combustion promoter is required as the temperature is raised to reduce the CO concentration to a given level. The maximum regeneration zone temperature used is governed by the catalyst stability and by the metallurgy of regeneration zone 26. In low temperature regeneration, where the temperature in regeneration zone 26 ranges from about 1125° F. to about 1250° F., relatively large amounts of combustion promoter are required and relatively high concentrations of oxides of nitrogen are formed, while in high temperature regeneration, where the temperature in dense phase catalyst bed 30 of regeneration zone 26 may range from about 1310° F. to about 1360° F., lower amounts of combustion promoter can be used and the oxides of nitrogen concentration produced generally will be lower. While the subject invention is applicable to both high and low temperature regeneration, it is particularly applicable to high temperature regeneration for controlling the oxides of nitrogen concentration to relatively low values. In a typical commercial cracking unit utilizing high temperature regeneration, the concentration of the active metal component is typically between about 0.05 and 100 wppm, based upon the total weight of catalyst present.

EXAMPLE 1

The relative ability of catalyst to promote the combustion of CO to $CO_2$ is frequently compared by the use of an activity scale in which values of 40 to 60 indicate high activity, values of 20 to 30 indicate average activity, values of 5 to 20 indicate low activity and values of 0 to 4 indicate essentially no activity. The CO activity test is described in a paper presented at the 1979 National Petroleum Refiners' Association Annual Meeting by Arthur W. Chester and Frank D. Hartzell entitled *Partial and Complete CO Combustion FCC Regeneration With Promoted Catalyst Systems,* the disclosure of which is incorporated herein by reference. Table I lists comparative data for two units, one utilizing a conventional catalyst with CO combustion promoter having an activity of 24, while the other utilized a non-promoted catalyst having a CO combustion activity of about 3. In these tests the concentration of oxides of nitrogen in the exit flue gas was determined by the use of a Draeger Model 31 gas sampler which measured a slip stream of gas from line 60.

TABLE I

| | Catalyst With Conventional Amount of Combustion Promoter | Non-Promoted Catalyst |
|---|---|---|
| CO Combustion Activity of Catalyst | 24 | Approx. 3 |
| Air Flow Rate (SCFM) | 10,000 | 90,000 |
| Regeneration Bed Temp (°F.) | 1,315 | 1,323 |
| Regeneration Dilute Phase Temp (°F.) | 1,323 | 1,340 |
| Steam used to quench cyclone outlet | No | Yes |

TABLE I-continued

| | Catalyst With Conventional Amount of Combustion Promoter | Non-Promoted Catalyst |
|---|---|---|
| temperature | | |
| Regeneration Hold-up Tons | 24 | 276 |
| Flue Gas Analysis (Dry) | | |
| CO VPPM | 3,000 | 200 |
| $CO_2$ Vol % | 17.4 | 18.0 |
| $O_2$ Vol % | 0.1 | 0.5 |
| $NO_x$ VPPM | 400–600 | 2 |

As may be seen from the data on Table I, reduction in the levels of oxidation promoter from those conventionally used will achieve significant reductions in the oxides of nitrogen concentration. Frequently, however, this increases the carbon monoxide levels in the regenerator flue gas being discharged through line 60. The carbon monoxide level in the exit flue gas may be reduced by several methods including elevating the regeneration zone temperature, increasing the relative excess of oxygen in the regeneration gas passed through line 36 into regeneration zone 26 and decreasing the coke make rate. Methods for reducing the coke make rate and hence the coke concentration on the catalyst are well known by those skilled in the art and will not be described herein.

Since the conversion of CO to $CO_2$ is promoted by increasing regeneration zone temperature, the combination of both low $NO_x$ and low CO concentrations in the exit flue gas is most easily achieved when the dense phase regeneration zone temperatures are relatively high, such as 1310° to 1360° F., and preferably 1310° to 1340° F. At lower regeneration temperatures, high CO concentrations will result unless the coke make rate is reduced, excess regeneration gas is used or additional combustion promoter is utilized as previously indicated. This latter method will increase the $NO_x$ concentration.

EXAMPLE 2

A further demonstration of the relationship between the catalyst activity and the oxides of nitrogen concentration in the regeneration zone exit flue gas may be seen from Table II where fresh combustion promoter was added to cracking catalyst. Table II indicates that the rate at which combustion promoter catalyzes the formation of oxides of nitrogen decreases relatively rapidly. Thus, in areas where oxides of nitrogen are of a concern, it is not advisable to add large quantities of completely fresh combustion promoter to the system at one time.

TABLE II

| | Sample I | Sample II |
|---|---|---|
| $NO_x$ Concentration Initially (vppm) | 7 | 14 |
| Amount of Combustion Promoter Added (wppm) | 15 | 15 |
| $NO_x$ Concentration after Promoter addition | | |
| 5 min. | 37 | 65 |
| 15 min. | 25 | 45 |
| 30 min. | 14 | 30 |
| 45 min. | — | 20 |

Preferred separation means 48 and 54 will be cyclone separators, multiclones or the like whose design and construction are well known in the art. In the case of cyclone separators, a single cyclone may be used, but preferably more than one cyclone will be used in parallel or in series flow to effect the desired degree of separation. However, even utilizing such separation means, the gaseous effluent from the cracking unit still will contain entrained catalyst particles. For example, the concentration of catalyst particles in the exit flue gas in line 60 should be less than about 1 and preferably less than about 0.2 grains per actual cubic foot. (The term actual cubic foot refers to the volume measured at actual operating conditions without correction to a standard temperature and pressure.) As a result, even with highly efficient separation means, fresh cracking catalyst must be added to make up for catalyst losses. In a typical commercial cracking unit, those losses may approach 2000 pounds a day. In a steady state operation, combustion promoter normally is added with the make-up cracking catalyst to replace entrainment losses and to replace promoter which has become poisoned. Therefore, when $NO_x$ sensor 62 indicates that the $NO_x$ concentration in the exit flue gas exceeds predetermined limits, the catalyst added to the system should contain reduced quantities of combustion promoter or no combustion promoter at all. If the rate of addition of combustion promoter free-catalyst to the system would not reduce the $NO_x$ level to the desired limits within an acceptable time, it may be possible to reduce the $NO_x$ level by "poisoning" the combustion promoter by the addition of a selective deactivating agent such as lead, antimony, arsenic, tin, bismuth or other substances which will selectively deactivate the combustion promoter relative to the cracking catalyst. Yet another method of decreasing the combustion promoter concentration would be to remove catalyst containing combustion promoter from the cracking unit and replace it with catalyst free of combustion promoter. This latter method is not preferred because of the relatively large quantities of catalyst which would have to be removed from the system to effect a significant reduction in the concentration of combustion promoter within the system. Conversely, when the $NO_x$ concentration is well below the predetermined limit, additional combustion promoter may be added to facilitate the conversion of CO to $CO_2$. This would permit the amount of excess oxygen in the exit flue gas as measured by sensor 66 to be decreased by decreasing the regeneration gas inlet rate, or, if the regeneration gas inlet rate is maintained constant, this would permit an increase in the catalyst circulation rate to the regeneration zone. Increasing promoter activity may be accomplished in a variety of ways. Since the oxidation promoters normally are used in relatively low concentrations, frequently they are incorporated with conventional cracking catalyst into a concentrate to provide a more uniform distribution. Thus, the combustion promoter concentrate may be added directly. A catalyst containing a relatively high amount of combustion promoter may be utilized as make-up catalyst. Combination promoter also could be dissolved in an easily volatilized solution and pumped into the system. Since the oxidation promoter adversely affects feedstock cracking products, the promoter preferably is added to regeneration zone 26.

In general, any commercial catalytic cracking catalyst designed for high thermal stability could be suitably employed in the present invention. Such catalysts include those containing silica and/or alumina. Other refractory metal oxides such as magnesia or zirconia may be employed and are limited only by their ability to be effectively regenerated under the selected conditions. With particular regard to catalytic cracking, preferred catalysts include the combination of silica and alumina, containing 10 to 50 wt. % alumina, and particularly their admixtures with molecular sieves or crystalline aluminosilicates. Suitable molecular sieves include both naturally occurring and synthetic aluminosilicate materials, such as faujasite, chabazite, X-type and Y-type aluminosilicate materials and ultra-stable, large pore crystalline aluminosilicate materials. When admixed with, for example, silica-alumina to provide a petroleum cracking catalyst, the molecular sieve content of the fresh finished catalyst particles is suitably within the range from 5-15 wt.%, preferably 8-10 wt.%. An equilibrium molecular sieve cracking catalyst may contain as little as about 1 wt.% crystalline material. Admixtures of clay-extended aluminas may also be employed. Such catalysts may be prepared by any suitable method such as by impregnation, milling, cogelling, and the like, subject only to provision of the finished catalyst in a physical form capable of fluidization.

The combustion promoter employed in not believed to be critical, and normally will be selected based upon its relative effectiveness as an oxidation promoter while having a minimal effect on cracked feedstock products. Commercially available oxidation promoters normally comprise one or more of the following metals: gold, silver, platinum, palladium, iridium, rhodium, mercury, ruthenium, osmium or rhenium. Of these, it appears that the most widely used is platinum. In a conventional catalytic cracking system where the oxides of nitrogen must be regulated, it is expected that the concentration of the aforementioned metals in the catalyst will be below about 10 wppm, based on the weight of the elemental metal in the total weight of catalyst, preferably, below about 3 wppm and possibly even below 1 wppm.

The regeneration zone employed in the present invention normally comprises vertical cylindrical vessels wherein the catalyst to be regenerated is maintained as a fluidized bed by the upward passage of an oxygen-containing regeneration gas thereby forming a dense phase catalyst bed and a dilute catalyst phase with an interface in between. The dense phase bed, which is usually located in the lower portion of the regeneration zone, is maintained at a temperature in the range of from about 1150°–1350° F., preferably from about 1250°–1320° F. The density of the dense phase bed may range from about 8 to about 30 lb./cu. ft.

The dilute catalyst phase is the primarily gaseous phase volume located above the dense phase bed within the regeneration zone. Specifically, the dilute phase contains relatively small quantities of catalyst compared to the dense phase bed. For example, the density of the dilute phase zone ranges from about 0.1 to about 1.0 lb/cu. ft. at the inlet to the separation means and from about 1 to about 5 lb/cu. ft. near the interface between the dense bed phase and the dilute catalyst phase. In many instances, the overall flow in the dilute phase is a concurrent flow of catalyst entrained with flue gases. It is contemplated that the dilute catalyst phase can include substantial quantities of the dense bed material which passes into that phase from excessive agitation or bubbling of gaseous materials through the dense bed. In general, the temperature in the dilute catalyst phase is at least that in the dense bed phase and is advantageously maintained within the range from about 1200° to about 1450° F., preferably from about 1350° to about 1400° F.

The construction of the regeneration zone can be made with any material sufficiently able to withstand the relatively high temperatures involved when afterburning is encountered within the zone and the high attrition conditions which are inherent in systems wherein fluidized catalyst is regenerated and transported. Specifically, metals are contemplated which may or may not be lined. More specifically, ceramic liners are contemplated within any and all portions of the regeneration zone together with alloy use and structural designs in order to withstand temperatures of about 1400° F. and, for reasonably short periods of time, temperatures which may be as high as 1800° F.

The pressure in the regeneration zone is usually maintained in a range from about atmospheric to about 50 psig, preferably from about 10 to 50 psig. It is preferred, however, to design the regeneration zone to withstand pressures of up to about 100 psig. Operation of the regeneration zone at increased pressure has the effect of promoting the conversion of carbon monoxide to carbon dioxide and reducing the temperature level within the dense bed phase at which the substantially complete combustion of carbon monoxide can be accomplished. The higher pressure also lowers the equilibrium level of carbon on regenerated catalyst at a given regeneration temperature.

The residence time of the spent catalyst in the regeneration zone is not critical. In general, it can vary from about 1 to about 6 minutes. Typically it can vary from about 2 to about 4 minutes. The contact time or residence time of the flue gas in the dilute catalyst phase establishes the extent to which the combustion reaction can reach equilibrium. The residence time of the flue gas may vary from about 10 to about 60 seconds in the regeneration zone and from about 2 to about 15 seconds in the dense bed phase. Preferably, the residence time of the flue gas varies from about 15 to about 20 seconds in the regeneration zone and from about 6 to about 10 seconds in the dense bed.

The present invention may be applied beneficially to any type of fluid cat cracking unit with little or no modifications and without limitations as to the spatial arrangement of the reaction, stripping, and regeneration zones thereof. The regeneration zone of a catalytic cracking unit can be designed independently from the reaction zone since the regeneration zone merely receives spent catalyst, oxidizes the coke thereon to regenerate the catalyst, and returns the regenerated catalyst to the reaction zone. Therefore, the reaction zone can be a pure transfer line, i.e., one in which the reaction occurs in a single pipe-type vessel directly terminating in a rough cut cyclone or cyclones, a conventional dilute riser/dense bed combination or a dense bed alone.

Although the subject process has been described with reference to a specific embodiment, it will be understood that it is capable of further modification. Any variations, uses or adaptations of the invention following, in general, the principles of the invention are intended to be covered, including such departures from the present disclosure as come within known or customary practice in the art to which the invention pertains and as may be applied to the essential features hereinbefore set forth, and as fall within the scope of the invention.

What is claimed is:

1. In a catalytic cracking process wherein:
   (a) hydrocarbon feedstock is contacted with a cracking catalyst under cracking conditions to produce cracked hydrocarbon vapors and coke contaminated catalyst; and
   (b) the coke contaminated catalyst subsequently is contacted in a regeneration zone under regeneration conditions in the presence of a carbon monoxide combustion promoter with an oxygen and nitrogen-containing regeneration gas to thereby at least partially combust the coke and form oxides of nitrogen which thereafter become part of the exit flue gas, the improvement which comprises:
      (i) monitoring the oxides of nitrogen concentration in the exit flue gas from the regeneration zone; and
      (ii) adjusting the concentration of combustion promoter in the regeneration zone in relation to the concentration of nitrogen oxides monitored in the flue gas to maintain the concentration of nitrogen oxides in the flue gas below a predetermined level.

2. The process of claim 1 comprising monitoring the regeneration zone flue gas to determine the presence of CO therein and adjusting the regeneration zone temperature to maintain the CO concentration in the flue gas below a predetermined level.

3. The process of claim 1 comprising monitoring the regeneration zone flue gas to determine the presence of CO therein and adjusting the flow of regeneration gas to the regeneration zone to maintain the CO concentration in the flue gas below a predetermined level.

4. The process of claim 1 comprising monitoring the regeneration zone flue gas to determine the presence of CO therein and adjusting the coke concentration on the coke contaminated catalyst to thereby maintain the CO concentration in the flue gas below a predetermined level.

5. The process of claim 1 wherein the combustion promoter includes a metal selected from the class of compounds consisting of gold, silver, platinum, palladium, iridium, rhodium, mercury, ruthenium, osmium, or rhenium.

6. The process of claim 5 wherein the concentration of combustion promoter is maintained below about 10 ppm by weight of elemental metal, based on the total weight of the catalyst.

7. The process of claim 6 wherein the concentration of combustion promoter is maintained below about 3 ppm by weight of elemental metal, based on the total weight of the catalyst.

8. The process of claim 7 wherein the concentration of combustion promoter is maintained below about 1 ppm by weight of elemental metal, based on the total weight of the catalyst.

9. The process of claim 6 wherein make-up cracking catalyst periodically is added to the system and wherein the concentration of combustion promoter is adjusted by regulating the concentration of combustion promoter in the make-up catalyst.

10. The process of claim 6 wherein the concentration of combustion promoter is adjusted by preparing a solution of the combustion promoter in a solvent and adding the solution to the catalytic cracking system.

11. The process of claim 6 wherein a selective deactivating agent is added to the system to decrease the activity of the combustion promoter and thereby lower the oxides of nitrogen concentration in the exit flue gas.

12. The process of claim 11 wherein the selective deactivating agent is selected from the class of compounds comprising lead, antimony, arsenic, tin, bismuth.

* * * * *